Patented Dec. 23, 1947

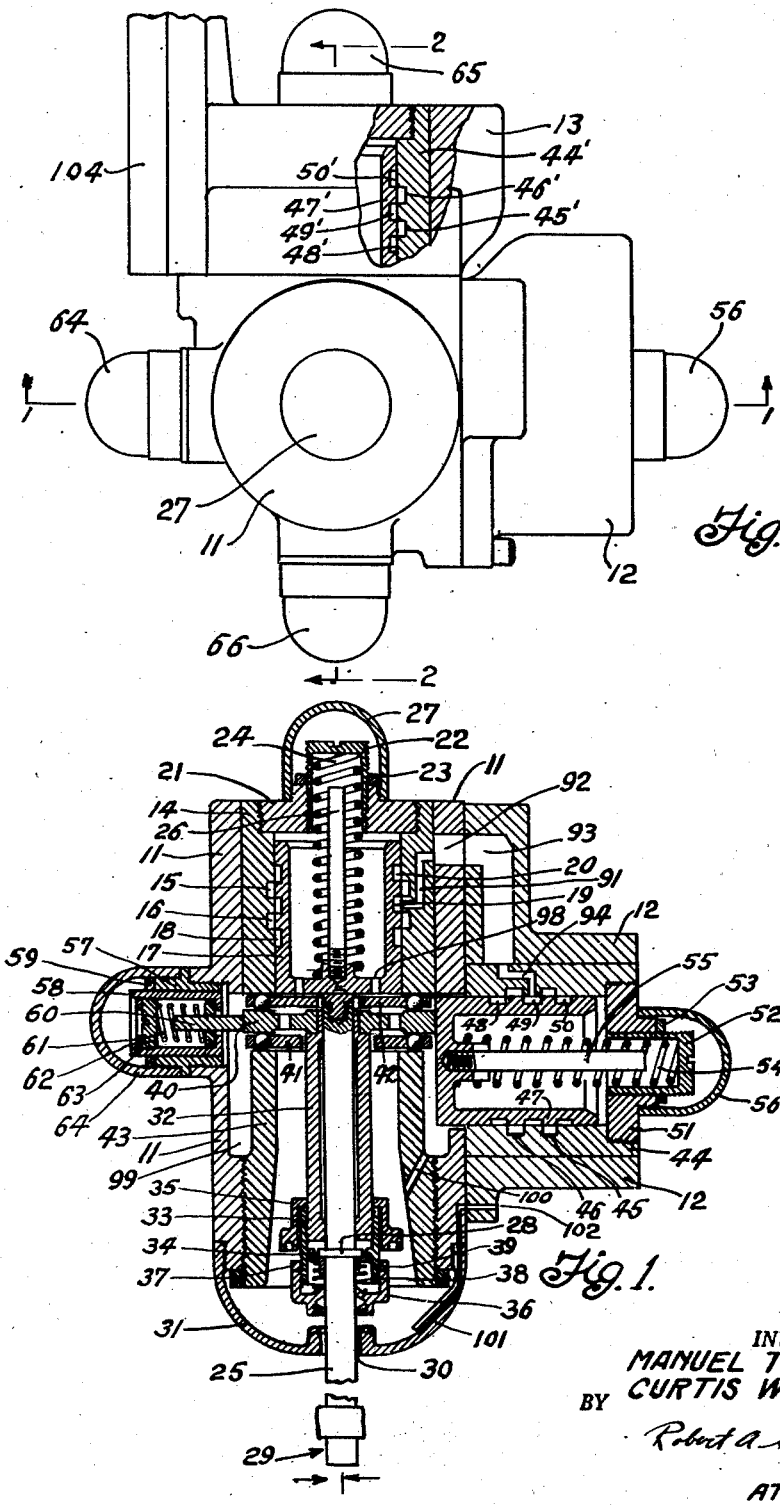

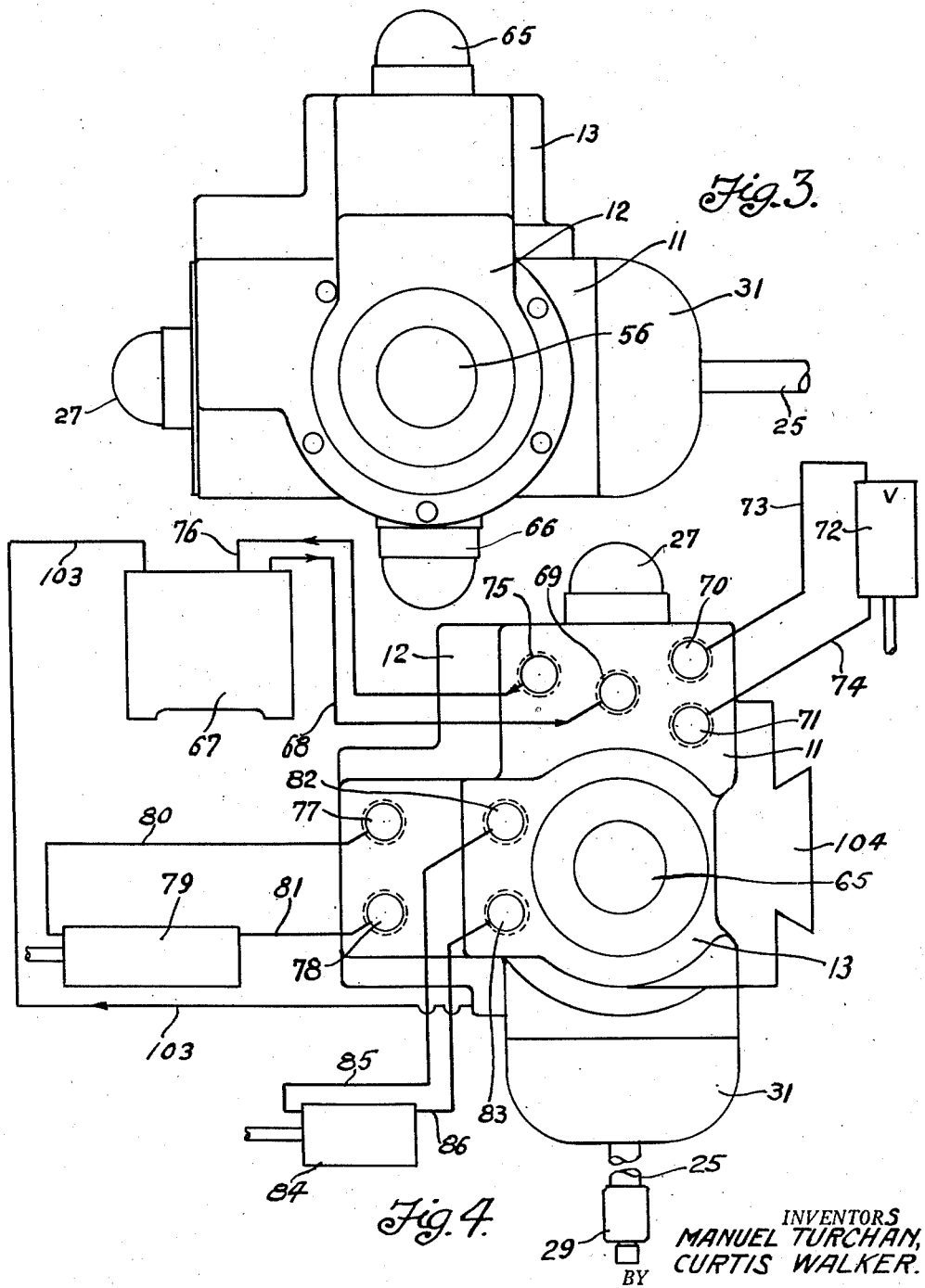

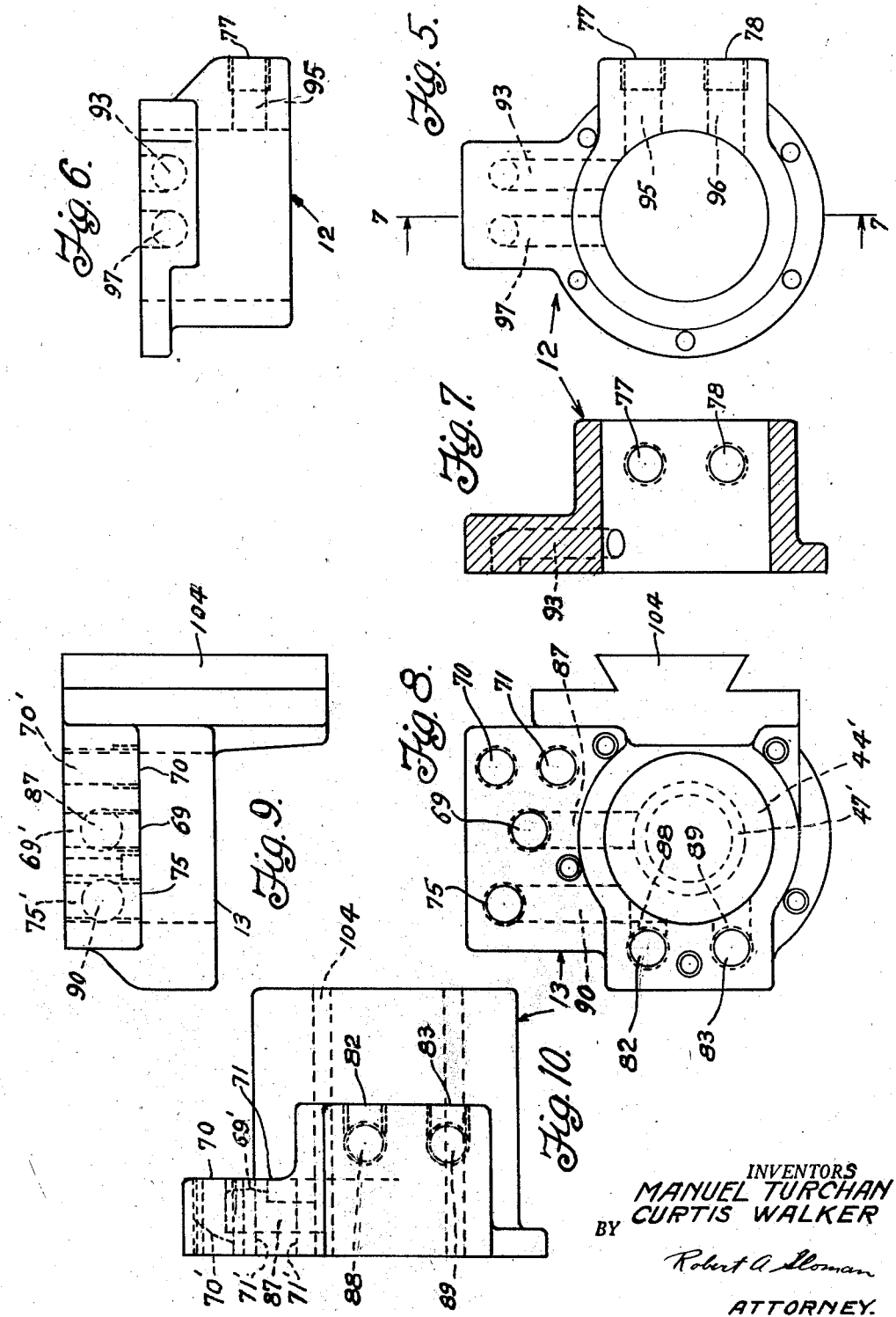

2,433,005

UNITED STATES PATENT OFFICE 2,433,005

THREE-DIMENSIONAL TRACER

Manuel Turchan, Dearborn, and Curtis Walker, Detroit, Mich.

Application January 1, 1944, Serial No. 516,734

28 Claims. (Cl. 90—62)

This invention relates to a three dimensional pencil type tracer, and more particularly to a tracer mechanism adapted to cooperatively engage a pattern sought to be reproduced by a cutting tool in metal, wherein translation and traverse of the tracer spindle upon the surface of the pattern is accomplished by manually grasping said spindle and actuating the same.

It is the object of the present invention to provide a manually operated tracer mechanism for controlling simultaneously fluid under pressure to one end or the other of three relative transverse feed cylinders, i. e., longitudinal, cross and vertical feed cylinders.

It is the object herein to provide said feed cylinders or hydraulic motors joined either to the work piece and pattern supporting table or to the cutter and tracer support for controlling three dimensional feeding of the pattern and work piece relatively to the tracer and cutter.

It is the further object herein to provide within the tracer housing a reciprocable vertically disposed valve piston controlled by vertical movements of the tracer spindle for regulating relative vertical feeding; a transverse, horizontally reciprocable valve piston controlled by longitudinal translatory movements of the spindle for regulating relative longitudinal feeding; and a second transverse horizontally reciprocable valve piston controlled by cross translatory movements of the spindle for regulating relative cross feeding of the cutter and work piece.

It is the still further object of this invention to provide means within the tracer housing for limiting translational movements of the spindle so that in all positions thereof the longitudinal axis thereof is parallel to the vertical axis of the tracer housing.

It is the still further object of this invention to provide a hydraulic unit for supplying fluid under pressure to the tracer housing for direction through suitable conduits therein to the fluid pressure intake ports of each of the three control valves. Furthermore suitable exhaust conduits are provisioned within said housing for conducting exhaust fluid from each control valve to an exhaust port in said housing for direction to said hydraulic unit and the storage sump therein.

Other objects will appear in the following specification and claims describing the various elements of the tracer mechanism, and the hydraulic connections thereto, as well as the various combinations of elements as fully illustrated in the accompanying drawings of which—

Fig. 1 is a front elevational section of the tracer on line 1—1 of Fig. 2, as well as a transverse side elevational section thereof on lines 2—2 of Fig. 2.

Fig. 2 is a top plan view of the tracer.

Fig. 3 is a projected side elevational view thereof.

Fig. 4 is a rear elevational view of the tracer diagrammatically illustrating the hydraulic connections therefor.

Fig. 5 is a side elevational view of the tracer short body showing the longitudinal feed cylinder ports as well as the fluid pressure supply and exhaust conduits.

Fig. 6 is a top plan view of the same.

Fig. 7 is a section on line 7—7 of Fig. 5.

Fig. 8 is a rear elevational view of the tracer body corresponding to Fig. 4.

Fig. 9 is a top plan view thereof; and

Fig. 10 is a left side elevational view thereof.

It will be understood that the drawings merely illustrate a preferable embodiment of the invention by way of illustration, other embodiments being contemplated within the scope of said invention as claimed hereafter.

Referring to the drawings, the three dimensional hand operated tracer consists of a hollow cylindrical body 11, and the hollow horizontally disposed short bodies 12 and 13, provisioned at right angles thereto as shown in Fig. 2.

Hollow cylindrical valve sleeve 14 with annular openings 15 and 16 is provisioned within the top portion of body 11. Vertically and reciprocably disposed therein is hollow cylindrical vertical feed control piston 17 with annular openings 18, 19 and 20.

Hollow cap 21 threaded within the top of sleeve 14 has adjustably threaded therethrough, hollow cylindrical spring adjusting nut 22 secured in adjusted position by lock ring 23.

Cylindrical compression spring 24 interposed between adjusting nut 22 and control piston 17, thereby urges said piston downwardly against the upper end of tracer spindle 25 provisioned longitudinally within tracer body 11. A suitable spring guide 26 is carried by piston 17 projecting up through spring 24. Further hollow cover 27 is provisioned over adjusting nut 22 and removably threaded to cap 21.

Spindle 25 with annular collar 28 and tracer tip 29, projects through opening 30 in barrel 31 on the bottom of body 11, said spindle being adapted to upward vertical movement upon engaging an elevation in the pattern it traverses, as well as vertical downward movement upon reaching a declivity therein.

Said upward movement causes corresponding upward movement of control piston 17 against spring 24; while on the other hand said spring tending to cause downward movement of piston 17, facilitates this movement when the tracer tip 29 reaches the declivity mentioned.

Hollow spindle guide 32 through which said spindle reciprocably slides, also provides therefore a resilient adjustable floating support consisting of a hollow stop adjusting nut 33, with an interior annular flange 34, said nut being adjustably threaded to the bottom of guide 32. A suitable lock nut 35 projects over the top of nut 33 threadably engaging sleeve 32.

Spring adjusting nut 36 threadably secured to the bottom of stop adjusting nut 33, and retained by lock nut 37, carries coiled spring 38, the upper end of which operatively engages and carries spindle stop 39. Stop 39 through which spindle 25 is slidable, is limited in its upward movement by annular member 34; while collar 28 on spindle 25 rests upon said stop. Thus a resilient floating adjustable support is provided for spindle 25.

Guide 32 which carries the floating support for spindle 25 is secured at its upper end to laterally translatable stabilizer disc 40 supported between the ball bearing retainers 41 and 42. Retainer 41 is supported by stabilizer adjusting sleeve 43 threadably provisioned and secured within tracer body 11. On the other hand, ball retainer 42 is interposed between stabilizer 40 and the bottom edge of sleeve 14. Thus stabilizer disc 40 is adapted to lateral translation within tracer body 11 between retainers 41 and 42 with its long axis at all times maintained perpendicular to the vertical axis of the tracer. Consequently spindle 25 and its guide 32 are also adapted to lateral translatory movement with their central longitudinal axis at all times maintained parallel to the vertical tracer housing axis.

Furthermore it is noted that stabilizer 40 is adapted to universal movement in any transverse direction perpendicular to the vertical axis of the tracer housing. Translatory movement of spindle 25 either to the left or right is adapted to control relative longitudinal feed movements of the cutter and work piece, while reciprocable transverse movements at right angles thereto is adapted to control relative cross feeding movements, in the manner hereafter described. It will be seen also that resultant angular movements of spindle 25 can be effected resulting in simultaneous hydraulic control of both longitudinal and cross feeding movements.

As shown in Fig. 1 hollow transverse short body 12 horzontally projects from tracer body 11, with the hollow cylindrical valve sleeve 44 therein having annular openings 45 and 46. Relative longitudinal feed control piston 47 having annular openings 48, 49 and 50 is horizontally and reciprocably provisioned within sleeve 44, with movements thereof being governed by horizontal right or left or angular movements of stabilizer 40 above described.

Hollow cap 51, similar to cap 21, threaded within the end of sleeve 44, has adjustably threaded therethrough, hollow spring adjusting nut 52 secured by locking ring 53. Similarly coil spring 54 interposed between nut 52 and the left end of piston 47 is adapted to adjustably and resiliently urge said piston to the left in continuous operative engagement with stabilizer disc 40.

Thus on manual displacement of spindle 25 and its guide 32 to the left or angularly to the left, piston 47 is permitted to move to the left sufficiently to affect hydraulic control of relative longitudinal feed movements in the manner hereafter described. Here also a spring guide 55 projects from piston 47 and through spring 54. Also a removable cover 56 is provisioned over adjusting nut 52 and threaded to cap 51.

A resilient stop adjustment is provided for stabilizer 40 consisting of a hollow adjustment holder 57 provisioned oppositely from piston 47 and threadably secured within a corresponding annular opening in tracer body 11.

Cylindrical stop adjusting means 58 threadably and adjustably provisioned within holder 57 and secured by lock ring 59, has reciprocably provisioned therein annularly flanged stop 60. Stop 60 slidably projected through the inner end of adjusting means 58 operatively and reactively engages the surface of stabilizer 40 at a point diametrically opposite from the point of engagement thereof and piston 47.

Coil spring 61 within adjusting means 58 operatively engages one end of the flanged portion of stop 60, with its other end being adjustably retained by spring adjusting nut 62 secured by lock ring 63. Cover 64 provisioned over said resilient stop mechanism is removably and threadably secured to stop holder 57.

Manually effected translation to the left of tracer spindle 25 results in a corresponding movement of stabilizer 40 permitting longitudinal feed control piston 47 to move to the left under action of coiled spring 54.

At the same time stabilizer 40 engaging resilient stop 60, causes a similar corresponding movement to the left thereof partially compressing spring 61. When manual pressure is relieved from spindle 25, it returns to its initial central position within body 11, inasmuch as spring 61 compressed overcomes partially the reduced expansive force of the already partially expanded spring 54.

In the central position of spindle 25, both springs 54 and 61 are balanced. It is seen that adjustments of the tensions of springs 54 and 61 are respectively made by adjusting nuts 52 and 62.

On the other hand if spindle 25 is manually moved to the right, such movement causes a corresponding movement of piston 47 compressing spring 54. At the same time coil spring 61 engaging stop 60 is expanded so that on removing the pressure from the spindle, the same will return to its central spring balanced position as shown in Fig. 1.

While Fig. 1 represents a vertical section on line 1—1 of Fig. 2, said figure also corresponds to a vertical section taken on line 2—2 of Fig. 2. The secondary cross feed control valve short body 13 extends horizontally from tracer body 11 at right angles thereto, as well as at right angles to longitudinal feed control valve short body 12.

Body 13 as shown in Fig. 2, similarly has a valve sleeve 44' and horizontally reciprocable piston 47' corresponding to sleeve 44 and piston 47 with corresponding annular fluid control openings 45', 46', 48', 49' and 50' therein.

Said cross feed control piston operatively engages stabilizer 40 under resilient action of an adjustable tension coil spring, similar to spring 54, with the spring tension adjusting nut being covered by removable cover member 65 shown in Figs. 2 and 3.

Similarly a resilient stop oppositely engages stabilizer 40 and is movable therewith against compressive action of an adjustable coil spring similar to coil spring 61. Here also the spring adjusting nut is covered by cover member 66 removably secured to tracer body 11.

As Fig. 1 represents sections on lines 1—1 and 2—2 of Figure 2, it is understood that the parts in caps 65, 66 are identical to the parts contained in caps 56, 64.

Transverse manual movements of spindle 25 thereby control movements of the cross feed control piston 47' exactly in the manner described with respect to horizontal feed control piston 47. It is understood that the coil springs for the piston and for the stop are adjustably balanced to normally maintain the spindle in a central inoperative position.

To obtain simply a relative longitudinal feed, spindle 25 is manually moved either to the right or to the left; while merely a relative cross feed is obtained by similar translatory movements of spindle 25 at right angles to said right and left movements. Any other movement of spindle 25 will cause simultaneous control movements of the longitudinal as well as cross feed control pistons, resulting in a resultant angular relative movement between the cutter and work piece.

It is seen further that such angular movement of spindle 25 may also be accompanied with vertical movements thereof depending upon the top surface irregularities in the pattern. In that case, and in the manner above described, vertical control piston 17 is actuated, effecting also a corresponding relative vertical feeding movement of the cutter and work piece, i. e., a three dimensional movement.

Referring to Fig. 4, which is a rear elevational view of the tracer, the hydraulic connections therefore are diagrammatically indicated. The hydraulic unit 67 containing a fluid storage sump, also has a suitable pump for supplying fluid under pressure through conduit 68 to tracer intake port 69, whence it is directed to each of the three control pistons in the manner hereafter set out.

Cylinder ports 70 and 71 respectively join vertical feed control cylinder 72 through conduits 73 and 74. Fluid under pressure from intake port 69 is directed to annular opening 19 in control piston 17 and with the latter upwardly displaced, this fluid is directed to sleeve opening 15 and thence to tracer port 70. Exhaust fluid from cylinder 72 returning to tracer port 71 is returned to sleeve opening 16 and with piston 17 elevated, is conducted to piston opening 18 which communicates with tracer exhaust port 75. Exhaust fluid returns from port 75 through conduit 76 to hydraulic unit 67.

If piston 17 is depressed from its neutral inoperative position shown in Fig. 1, fluid under pressure at opening 19 goes into sleeve opening 16 for direction out port 71 to cylinder 72, with exhaust fluid returning via conduit 73, port 70, sleeve opening 15, piston opening 20 and exhaust port 75.

Similarly fluid from intake port 69 is directed to longitudinal feed control piston opening 49 for direction out either opening 45 or 46 to either tracer port 77 or 78 which respectively communicate with longitudinal feed cylinder 79 through conduits 80 and 81.

Exhaust fluid from cylinder 79 returns through either conduit 80 or 81 to either port 77 or 78, for direction to either sleeve opening 45 or 46. Depending upon the positioning of piston 47, exhaust fluid enters either piston opening 48 or 50, both of which join tracer exhaust port 75.

It is understood that with piston 47 moved to the right, fluid at piston opening 49 goes to sleeve opening 45; and if moved to the left goes to opening 46. Whichever port 45 or 46 receives fluid for direction to the longitudinal feed cylinder 79, the other port receives exhaust fluid therefrom adapted to enter either piston opening 48 or 50.

Fluid from intake port 69 is directed to cross feed piston opening 49' shown in Fig. 2 for direction out either opening 45' or 46' to cylinder ports 82 or 83 which respectively communicate with cross feed cylinder 84 through conduits 85 and 86.

Exhaust fluid from cylinder 84 returns through either conduits 85 or 86 to either tracer cylinder port 82 or 83, for direction to either sleeve opening 45' or 46'. Depending upon the positioning of piston 47', exhaust fluid enters either piston opening 48' or 50' both of which join tracer exhaust port 75.

With piston 47' moved back, away from the observer, fluid at piston opening 49' enters sleeve opening 46'; and if moved forward from its initial central position, i. e., towards the observer, fluid from 49' enters sleeve opening 45'. Whichever port 46' or 45' receives fluid for direction to the cross feed cylinder 84 the other port receives the exhaust fluid therefrom.

Operation of the cross feed control piston 47' is effected by in and out manual transverse movements of tracer spindle 25 and stabilizer 40 for directing fluid to either tracer cylinder port 82 or 83.

Without further detailed description of the relative cross feed control piston 47' it is seen that the operation thereof is exactly the same as the operation of the longitudinal control piston 47.

Referring to Fig. 4 fluid is supplied under pressure to tracer port 69 for direction to each of the vertical, longitudinal and cross feed control valve pistons. Exhaust fluid from each of said pistons is returned to tracer exhaust port 75.

The vertical feed control piston 17 provides fluid under pressure out either tracer port 70 or 71. The longitudinal feed control piston 47 supplies fluid out either port 77 or 78; while the cross feed control piston 47 supplies fluid out either tracer port 82 or 83.

Figs. 5 through 10, now to be described, illustrate the method of distributing fluid within the tracer housing to each of the control pistons 17, 47 and 47' as well as to each of the six cylinder ports 70 and 71, 77 and 78, 82 and 83.

Fig. 8 is a rear elevational view of tracer short body 13 showing the pressure fluid intake port 69 from the hydraulic unit 67 shown in Fig. 4. Port 69 communicates with vertical channel 87 which in turn extends through the valve sleeve 44' and joins the annular opening 49' in the valve piston 47' as shown in detail in Fig. 2.

Depending upon the positioning of piston 47' fluid at opening 49' goes to either sleeve opening 46' or 45' which respectively join conduits 88 and 89, Fig. 8, which terminate in cross feed cylinder ports 82 and 83. If fluid is directed out cylinder port 82, then the exhaust fluid from the cross feed cylinder 84 returns through tracer port 83, conduit 89, sleeve opening 45', piston exhaust opening 48', sleeve 44' and conduit 90 in tracer short body 13 to tracer exhaust port 75. Or if exhaust fluid returns to cylinder port 82, it travels via openings 46' and 50', through sleeve 44' and exhaust conduit 80 to tracer exhaust port 75.

Pressure fluid from tracer port 69 also travels through corresponding conduit 69' in tracer short body 13 as shown in Fig. 9, enters tracer body 11, Fig. 1, vertical control sleeve 14, joining annular piston opening 19. With piston 17 slightly elevated fluid enters sleeve opening 15, and is conducted through conduit 70' which extends through tracer body 11 and tracer short body 13 corresponding to cylinder port 70 therein. Exhaust from the vertical feed cylinder 72 returns to tracer port 71 and travels through the corresponding connecting conduit 71' which extends back through tracer short body 13, Fig. 9, and tracer body 11, Fig. 1, sleeve 14 therein and enters sleeve opening 16. The latter opening is in communication with piston opening 18 which joins conduit 75', and is directed back to tracer exhaust port 75.

It is understood that with vertical control piston 17 slightly depressed below the position shown in Fig. 1, pressure fluid from conduit 69' joins opening 19 and enters opening 16 for direction through conduit 71' and tracer port 71. At the same time exhaust fluid from port 70 and conduit 70' enters sleeve opening 15, and then exhaust opening 20 for conduction through exhaust conduit 75' and port 75, as shown in Fig. 9.

Referring to Figs. 1, 5, 6 and 7, the pressure fluid which is directed through conduit 69' in body 13 and through sleeve 14 in body 11, to piston opening 19, is also directed through opening 91 in sleeve 14 into a communicating passage 92 in body 11 entering channel 93 in the tracer short body 12, shown in detail in Figs. 5, 6 and 7.

Pressure fluid in conduit 93 enters sleeve channel 94 in Fig. 1 and opening 49 in piston 47. Depending upon the positioning of said piston fluid is directed out either sleeve opening 45 or 46 which respectively communicates with channels 95 or 96 shown in Fig. 5, terminating respectively in cylinder ports 77 or 78.

If fluid goes out sleeve opening 45 and channel 95, exhaust fluid returns through channel 96 and sleeve opening 46 and into piston exhaust opening 48. From 48 exhaust fluid enters channel 97 in tracer body 12, and flows through a corresponding channel in tracer body 11 and its sleeve 14, to enter exhaust passage 75 above described.

Or on the other hand if exhaust fluid returns from the longitudinal feed cylinder 79 through channel 95 in body 12, it enters openings 45, 50 and channel 97 in body 12 which communicates with exhaust channel 75' in tracer bodies 11 and 13.

From the above description it is seen that fluid under pressure supplied to the tracer at port 69 is simultaneously directed to the three central openings 49', 49 and 19 in the three control pistons 47', 47 and 17. Consequently by virtue of the positioning of each of said pistons pressure fluid is directed to one end or the other of each of the cross feed, longitudinal feed and vertical feed cylinders 84, 79 or 72 respectively.

At the same time the exhaust fluids from each of said cylinders are directed back to the tracer for return out through exhaust port 75 for return to the hydraulic unit through conduit 76.

By manual application of tracer spindle 25 it is possible to actuate all three of said control pistons through vertical movements of the spindle, as well as any angular transverse movement thereof which causes corresponding transverse movements of stabilizer 40.

Referring to Fig. 1 openings 98 in the bottom of piston 17 permit downward seepage of any escaping oil. Said oil may drop down into the shell 31 or may enter annular opening 99 in tracer body 11. From opening 99 seeping oil may descend through opening 100 in stabilizer support 43 to accumulate at the bottom of the tracer.

A channel 101 is provided in shell 31 which extends up through body 11 and body 12 terminating at port 102, to which is joined vacuum conduit 103 from hydraulic unit 67 as shown in Fig. 4.

A vacuum producing unit is provisioned within said hydraulic unit and joined to conduit 103, whereby all oil seepage within shell 31 is returned to the storage sump within said hydraulic unit.

Figs. 2, 4 and 8 show the dove-tailed member 104 forming a part of tracer short body 12, providing means for adjustably supporting the tracer over the pattern sought to be reproduced.

While the above specification refers to the tracer spindle 25 as manually actuated relatively to the surface of the pattern, it is contemplated that other means might be employed for obtaining tracer spindle reaction to the surface of the pattern for obtaining operation and three direction control of the vertical, longitudinal and cross feed cylinders.

Having described our invention, reference should now be had to the claims which follow for determining the scope thereof.

We claim:

1. The combination, vertical, longitudinal, and cross feed cylinders, a tracer housing, a manually actuated vertically and horizontally translatable pattern engaging spindle therein, vertically movable valve means in said housing responsive to vertical movements of said spindle for controlling fluid to said vertical feed cylinder, longitudinally and horizontally movable valve means in said housing responsive to longitudinal horizontal translations of said spindle for controlling fluid to said longitudinal feed cylinder, transversely and horizontally movable valve means in said housing responsive to transverse horizontal translation of said spindle for controlling fluid to said cross feed cylinder, and transversely movable guide means carried by said housing through which said spindle is vertically slidable for maintaining said spindle parallel to said housing axis.

2. The combination, vertical, longitudinal and cross feed cylinders, a tracer housing, a manually actuated vertically and horizontally translatable pattern engaging spindle therein, vertically movable valve means in said housing responsive to vertical movements of said spindle for controlling fluid to said vertical feed cylinder, longitudinally and horizontally movable valve means in said housing responsive to longitudinal horizontal translations of said spindle for controlling fluid to said longitudinal feed cylinder, transversely and horizontally movable valve means in said housing responsive to transverse horizontal translations of said spindle for controlling fluid to said cross feed cylinder, fluid intake and exhaust ports in said housing, a plurality of channels formed therein for conducting pressure and exhaust fluid therefrom to and from each of said valve means, and transversely movable guide means carried by said housing through which said spindle is vertically slidable for maintaining said spindle parallel to said housing axis.

3. In a tracer, a housing, a manually actuated vertically and horizontally translatable pattern engaging spindle therein, vertically movable valve means in said housing responsive to vertical movements of said spindle adapted for controlling fluid to a vertical feed cylinder, horizontally movable valve means in said housing responsive to transverse horizontal movements of said spindle adapted for controlling fluid to a transverse feed cylinder, and transversely movable guide means carried by said housing through which said spindle is vertically slidable, for maintaining said spindle parallel to said housing axis.

4. In a tracer, a housing, a manually actuated vertically and horizontally movable pattern engaging spindle therein, vertically movable valve means in said housing responsive to vertical movements of said spindle adapted for controlling fluid to a vertical feed cylinder, longitudinally and horizontally movable valve means in said housing responsive to longitudinal horizontal movements of said spindle adapted for controlling fluid to a longitudinal feed cylinder, transversely and horizontally movable means in said housing responsive to transverse horizontal movements of said spindle adapted for controlling fluid to a cross feed cylinder, and transversely movable guide means carried by said housing through which said spindle is vertically slidable, for maintaining said spindle parallel to said housing axis.

5. The combination, a tracer housing, hollow transversely movable guide means supported therein, a manually actuated pattern engaging spindle vertically slidable through said means and transversely movable therewith, whereby said spindle is maintained parallel to said housing axis, vertically movable fluid control valve means responsive to vertical movements of said spindle, and transversely movable fluid control valve means responsive to transverse movements of said guide means.

6. The combination, a tracer housing, hollow transversely movable guide means supported therein, a manually actuated pattern engaging spindle vertically slidable through said means and transversely movable therewith, whereby said spindle is maintained parallel to said housing axis, vertically movable fluid control valve means responsive to vertical movements of said spindle, longitudinally and horizontally movable fluid control valve means responsive to longitudinal horizontal movements of said guide means, and transversely and horizontally movable fluid control valve means responsive to transverse horizontal movements of said guide means.

7. The combination, a tracer housing, hollow transversely movable guide means supported therein, a manually actuated pattern engaging spindle vertically slidable through said means, and transversely movable therewith, whereby said spindle is maintained parallel to said housing axis, vertically movable fluid control valve means responsive to vertical movements of said spindle, longitudinally and horizontally movable fluid control valve means, and transversely and horizontally movable fluid control means, both responsive to angular movements of said guide means.

8. The combination, a tracer housing, hollow transversely movable guide means supported therein, a manually actuated pattern engaging spindle provisioned through said means and transversely movable therewith, whereby said spindle is maintained parallel to said housing axis, longitudinally and horizontally movable fluid control valve means responsive to longitudinal horizontal movements of said guide means, and transversely and horizontally movable fluid control valve means responsive to transverse horizontal movements of said guide means.

9. The combination, a tracer housing, hollow transversely movable guide means supported therein, a manually actuated pattern engaging spindle vertically slidable through said means and transversely movable therewith, whereby said spindle is maintained parallel to said housing axis, vertically movable fluid control valve means responsive to vertical movements of said spindle, longitudinally and horizontally movable fluid control valve means responsive to longitudinal horizontal movements of said guide means, transversely and horizontally movable fluid control valve means responsive to transverse horizontal movements of said guide means, and resilient spindle supporting means carried by said guide means.

10. A tracer comprising a housing, hollow transversely movable guide means supported therein, a manually actuated pattern engaging spindle vertically slidable through said guide means and transversely movable therewith, whereby said spindle is maintained parallel to said housing axis, resilient spindle supporting means carried by said guide means, vertically movable fluid control valve means responsive to vertical movements of said spindle, and a plurality of transversely and horizontally movable fluid control valve means responsive to transverse movements of said guide means.

11. A tracer comprising a housing, hollow transversely movable guide means supported therein, a manually actuated pattern engaging spindle vertically slidable through said guide means and transversely movable therewith, whereby said spindle is maintained parallel to said housing axis, resilient spindle supporting means carried by said guide means, vertically movable fluid control valve means responsive to vertical movements of said spindle, longitudinally and horizontally movable fluid control valve means, and transversely and horizontally movable fluid control means, both responsive to angular movements of said guide means.

12. A tracer comprising a housing, hollow transversely movable guide means supported therein, a manually actuated pattern engaging spindle vertically slidable through said guide means and transversely movable therewith, whereby said spindle is maintained parallel to said housing axis, resilient spindle supporting means carried by said guide means, vertically movable fluid control valve means responsive to vertical movements of said spindle, longitudinally and horizontally movable fluid control valve means responsive to longitudinal horizontal movements of said guide means, and transversely and horizontally movable fluid control valve means responsive to transverse horizontal movements of said guide means.

13. A tracer comprising a housing, hollow transversely movable guide means supported therein, bearing means interposed between said guide means and said housing, a manually actuated pattern engaging spindle vertically slidable through said guide means and transversely movable therewith, whereby said spindle is maintained parallel to said housing axis, resilient spindle supporting means carried by said guide means, vertically movable fluid control valve means responsive to vertical movements of said spindle, and a plurality of transversely and horizontally movable fluid control valve means responsive to transverse movements of said guide means.

14. A tracer comprising a housing, hollow transversely movable guide means supported therein, a manually actuated pattern engaging spindle vertically slidable through said guide means and transversely movable therewith, whereby said spindle is maintained parallel to said housing axis, resilient spindle supporting means carried by said guide means, vertically movable fluid control valve means responsive to vertical movements of said spindle, a plurality of transversely and horizontally movable fluid control valve means responsive to transverse movements of said guide means, and bearing means interposed between said guide means and said housing, and between said guide means and said vertically movable control means.

15. A tracer comprising a housing, hollow transversely movable guide means supported therein, a manually actuated pattern engaging spindle vertically slidable through said guide means and transversely movable therewith, whereby said spindle is maintained parallel to said housing axis, resilient spindle supporting means carried by said guide means, vertically movable fluid control valve means responsive to vertical movements of said spindle, a plurality of transversely and horizontally movable fluid control valve means responsive to transverse movements of said guide means, bearing means interposed between said guide means and said housing, and between said guide means and said vertically movable control means, and means adjustably carried by said housing for supporting said first bearing means, and for regulating the pressure thereof on said guide means.

16. The combination, a tracer housing, hollow transversely movable guide means supported therein, a manually actuated pattern engaging spindle vertically slidable through said means and transversely movable therewith, whereby said spindle is maintained parallel to said housing axis, vertically movable fluid control valve means responsive to vertical movements of said spindle, longitudinally and horizontally movable fluid control valve means responsive to longitudinal horizontal movements of said guide means, transversely and horizontally movable fluid control valve means responsive to transverse horizontal movements of said guide means, resilient spindle supporting means carried by said guide means, and means for varying the resiliency of said supporting means.

17. The combination, a tracer housing, hollow transversely movable guide means supported therein, a manually actuated pattern engaging spindle vertically slidable through said means and transversely movable therewith, whereby said spindle is maintained parallel to said housing axis, vertically movable fluid control valve means responsive to vertical movements of said spindle, transversely movable fluid control valve means responsive to transverse movements of said guide means, resilient means for maintaining said vertically movable means in engagement with said spindle, and resilient means for maintaining said transversely movable means in engagement with said guide means.

18. The combination, a tracer housing, hollow transversely movable guide means supported therein, a manually actuated pattern engaging spindle vertically slidable through said means and transversely movable therewith, whereby said spindle is maintained parallel to said housing axis, vertically movable fluid control valve means responsive to vertical movements of said spindle, transversely movable fluid control valve means responsive to transverse movements of said guide means, adjustable resilient means for maintaining said vertically movable means in engagement with said spindle, and adjustable resilient means for maintaining said transversely movable means in engagement with said guide means.

19. The combination, a tracer housing, a hollow transversely movable guide means supported therein, a manually actuated pattern engaging spindle vertically slidable through said means and transversely movable therewith, whereby said spindle is maintained parallel to said housing axis, vertically movable fluid control valve means responsive to vertical movements of said spindle, transversely movable fluid control valve means responsive to transverse movements of said guide means, resilient means for maintaining said vertically movable means in engagement with said spindle, resilient means for maintaining said transversely movable means in engagement with said guide means, and resilient stop means engaging said guide means for regulating movements thereof.

20. The combination, a tracer housing, a hollow transversely movable guide means supported therein, a manually actuated pattern engaging spindle vertically slidable through said means and transversely movable therewith, whereby said spindle is maintained parallel to said housing axis, vertically movable fluid control valve means responsive to vertical movements of said spindle, transversely movable fluid control valve means responsive to transverse movements of said guide means, resilient means for maintaining said vertically movable means in engagement with said spindle, resilient means for maintaining said transversely movable means in engagement with said guide means, and adjustable resilient stop means engaging said guide means for regulating movements thereof.

21. The combination, a tracer housing, hollow transversely movable guide means supported therein, a manually actuated pattern engaging spindle vertically slidable through said means and transversely movable therewith, whereby said spindle is maintained parallel to said housing axis, vertically movable fluid control valve means responsive to vertical movements of said spindle, longitudinally and horizontally movable fluid control valve means responsive to longitudinal horizontal movements of said guide means, transversely and horizontally movable fluid control valve means responsive to transverse horizontal movements of said guide means, resilient means for maintaining said vertically movable means in engagement with said spindle, and resilient means for maintaining both said horizontally movable valve means in engagement with said guide means.

22. The combination, a tracer housing, hollow transversely movable guide means supported therein, a manually actuated pattern engaging spindle vertically slidable through said means and transversely movable therewith, whereby said spindle is maintained parallel to said housing axis, vertically movable fluid control valve means responsive to vertical movements of said spindle, longitudinally and horizontally movable fluid control valve means responsive to longitudinal horizontal movements of said guide means, resilient means for maintaining said vertically movable means in engagement with said spindle, resilient means for maintaining both said horizontally movable valve means in engagement with said guide means, and a plurality of adjustable resilient stop means engaging said guide means for regulating movements thereof, said stop means being oppositely disposed from each of said horizontally movable valve means.

23. The combination, a tracer housing, hollow transversely movable guide means supported therein, a manually actuated pattern engaging spindle vertically slidable through said means, and transversely movable therewith, whereby said spindle is maintained parallel to said housing axis, vertically movable fluid control valve means responsive to vertical movements of said spindle, longitudinally and horizontally movable fluid control valve means, transversely and horizontally movable fluid control means, both responsive to angular movements of said guide means, resilient means for maintaining said vertically movable means in engagement with said spindle, and resilient means for maintaining both said horizontally movable valve means in engagement with said guide means.

24. The combination, a tracer housing, hollow transversely movable guide means supported therein, a manually actuated pattern engaging spindle vertically slidable through said means resiliently supported thereby and transversely movable therewith, whereby said spindle is maintained parallel to said housing axis, vertically movable fluid control valve means responsive to vertical movements of said spindle, longitudinally and horizontally movable fluid control valve means, and transversely and horizontally movable fluid control means, both responsive to angular movements of said guide means.

25. The combination, a tracer housing, hollow transversely movable guide means supported therein, a manually actuated pattern engaging spindle provisioned through said means and transversely movable therewith, whereby said spindle is maintained parallel to said housing axis, longitudinally and horizontally movable fluid control valve means responsive to longitudinal horizontal movements of said guide means, transversely and horizontally movable fluid control valve means responsive to transverse horizontal movements of said guide means, resilient means for maintaining both valve means in engagement with said guide means, and resilient stop means engaging said guide means, being oppositely disposed from each of said horizontally movable valve means.

26. The combination, a tracer housing, hollow transversely movable guide means supported therein, a manually actuated pattern engaging spindle provisioned through said means and transversely movable therewith, whereby said spindle is maintained parallel to said housing axis, longitudinally and horizontally movable fluid control valve means responsive to longitudinal horizontal movements of said guide means, transversely and horizontally movable fluid control valve means responsive to transverse horizontal movements of said guide means, resilient means for maintaining both valve means in engagement with said guide means, and resilient stop means engaging said guide means, being oppositely disposed from each of said horizontally movable valve means.

27. In a tracer mechanism, a housing, a manually operable pattern engaging spindle therein, vertically movable valve means in said housing responsive to vertical movements of said spindle adapted for controlling fluid to a vertical feed cylinder, horizontally movable valve means in said housing responsive to transverse horizontal movements of said spindle adapted for controlling fluid to a transverse feed cylinder, a stabilizer mechanism within said housing for limiting said spindle to vertical movements and transverse axial movements relatively to said housing, consisting of a hollow annular disc through which the spindle is slidably disposed, and spaced horizontally disposed bearing members carried by said housing, between which said disc is horizontally movable whereby said spindle axis is maintained at all times parallel to said housing axis.

28. In a tracer mechanism, a housing, a manually operable pattern engaging spindle therein, a stabilizer mechanism within said housing for limiting said spindle to vertical movements and transverse axial movements relatively to said housing, consisting of a hollow annular disc through which the spindle is slidably disposed, spaced horizontally disposed bearing members carried by said housing, between which said disc is horizontally movable, and means depending from said disc for resiliently supporting and guiding said spindle.

MANUEL TURCHAN.
CURTIS WALKER.

REFERENCES CITED

The following references are of record in the file of this patent:

UNITED STATES PATENTS

| Number | Name | Date |
| --- | --- | --- |
| 2,079,720 | Shaw | May 11, 1937 |
| 2,107,063 | Roehm | Feb. 1, 1938 |
| 2,221,459 | Sassen | Nov. 12, 1940 |
| 2,331,817 | Turchan | Oct. 12, 1943 |
| 2,332,533 | Roehm | Oct. 26, 1943 |
| 2,162,491 | Rosen | June 13, 1939 |
| 2,332,532 | Roehm | Oct. 26, 1943 |
| 1,339,332 | Greenly | May 4, 1920 |

FOREIGN PATENTS

| Number | Country | Date |
| --- | --- | --- |
| 512,234 | Great Britain | Aug. 30, 1939 |